United States Patent
Kozlovski et al.

(10) Patent No.: US 11,411,954 B1
(45) Date of Patent: Aug. 9, 2022

(54) ACCESS CONTROL POLICY FOR PROXY SERVICES

(71) Applicant: Coretech LT, UAB, Vilnius (LT)

(72) Inventors: Miroslav Kozlovski, Vilnius (LT); Gytis Ciuta, Vilnius (LT); Valdemar Karasevic, Vilnius (LT)

(73) Assignee: Coretech LT, UAB, Vilnius (LT)

( * ) Notice: Subject to any disclaimer, the term of this patent is extended or adjusted under 35 U.S.C. 154(b) by 0 days.

(21) Appl. No.: 17/562,553

(22) Filed: Dec. 27, 2021

(51) Int. Cl.
  *H04L 29/06* (2006.01)
  *H04L 9/40* (2022.01)

(52) U.S. Cl.
  CPC ...... *H04L 63/0884* (2013.01); *H04L 63/0281* (2013.01); *H04L 63/20* (2013.01)

(58) Field of Classification Search
  CPC .. H04L 63/20; H04L 63/0281; H04L 63/0884
  See application file for complete search history.

(56) References Cited

U.S. PATENT DOCUMENTS

| | | |
|---|---|---|
| 7,681,229 B1 | 3/2010 | Ebrahimi et al. |
| 8,472,388 B2 | 6/2013 | Hjelm et al. |
| 8,782,260 B2 | 7/2014 | Taylor et al. |
| 8,893,239 B2 | 11/2014 | Cahill |
| 8,966,594 B2 | 2/2015 | Schneider |
| 9,038,138 B2 | 5/2015 | Trammel et al. |
| 9,407,664 B1 | 8/2016 | Banerjee |
| 9,430,628 B2 | 8/2016 | Kim et al. |
| 9,445,272 B2 | 9/2016 | Malinen et al. |
| 9,544,294 B2 | 1/2017 | Srinivasan et al. |
| 9,681,003 B1* | 6/2017 | Kim ...................... H04M 15/58 |
| 9,819,666 B2 | 11/2017 | Mowers et al. |
| 10,375,069 B2 | 8/2019 | Matsugashita |
| 10,440,151 B2 | 10/2019 | Smith, II et al. |
| 10,592,872 B2 | 3/2020 | Fosmark et al. |
| 10,673,861 B2 | 6/2020 | Karunakaran et al. |
| 10,922,772 B2 | 2/2021 | Chen et al. |
| 2003/0172145 A1* | 9/2003 | Nguyen ................ H04L 12/185 709/223 |
| 2008/0015988 A1 | 1/2008 | Brown et al. |
| 2008/0031227 A1* | 2/2008 | Wang ..................... H04L 67/306 370/352 |

(Continued)

FOREIGN PATENT DOCUMENTS

JP    4291213 B2    7/2009

*Primary Examiner* — Vance M Little
(74) *Attorney, Agent, or Firm* — Sterne, Kessler, Goldstein & Fox P.L.L.C.

(57) ABSTRACT

Systems and methods to manage and efficiently perform authorization of multiple proxy clients are disclosed. Furthermore, systems and methods to measure and check whether the web traffic of one or more client devices has reached a permissible limit of web traffic assigned by the proxy service provider. Specifically, a proxy is configured to gather and save authorization information of one or more clients within its memory. Therefore, the proxy server can verify and authorize one or more clients by utilizing the data from its memory. Furthermore, the proxy is configured to measure and report the utilized web traffic of one or more client devices to a messaging platform. In another aspect, systems and methods to check whether one or more client devices have reached a permissible amount of web traffic limit are disclosed.

18 Claims, 9 Drawing Sheets

(56) References Cited

U.S. PATENT DOCUMENTS

| | | | |
|---|---|---|---|
| 2013/0097309 A1* | 4/2013 | Ma | H04L 65/4084 |
| | | | 709/224 |
| 2015/0121447 A1* | 4/2015 | Jiang | H04L 63/0281 |
| | | | 726/1 |
| 2015/0264051 A1* | 9/2015 | Hoggan | H04W 12/065 |
| | | | 726/1 |
| 2017/0289053 A1* | 10/2017 | Byelov | H04L 47/25 |
| 2017/0302644 A1 | 10/2017 | Goodwin | |
| 2020/0028848 A1* | 1/2020 | Gupta | G06F 21/105 |
| 2021/0004297 A1* | 1/2021 | Scrivner | G06F 21/64 |

* cited by examiner

ACCESS CONTROL POLICY FOR PROXY SERVICES

FIELD

The disclosure is generally related to proxy technologies. Methods and systems disclosed herein aim to supplement the implementation of an effective proxy service.

BACKGROUND

In computer technology, the term "proxy server" refers to a server application instance that acts as an intermediary between a client requesting a resource and the servers providing that resource. In simple terms, proxy servers are intermediary servers that accept clients' requests for resources and forward these requests to a source server or other proxy servers. The word proxy means to "act on behalf of another"; therefore, in most cases, a proxy server acts on behalf of the client.

Many organizations employ proxy servers to maintain better network performance. Proxy servers can cache common web resources—so when a user requests a particular web resource, the proxy server will check to see if it has the most recent copy of the web resource and then sends the user the cached copy. This can help reduce latency and improve overall network performance to a certain extent. Here, latency refers specifically to delays that take place within a network. In simpler terms, latency is the time between user action and the website's response or application to that action—for instance, the delay between when a user clicks a link to a webpage and when the browser displays that webpage.

Forward proxies are proxy servers that route traffic between the client(s) and another system, usually external to the network. By doing so, forward proxies can regulate traffic according to preset policies, convert and mask client IP addresses, enforce security protocols and block unknown traffic. Systems with shared networks, such as business organizations or data centres, often use forward proxy servers. It should be mentioned that forward proxies expose a single interface with which clients interact without enforcing all of the policies and route management logic within the clients themselves.

Unlike a forward proxy, a reverse proxy is a proxy server that accepts requests from clients, forwards the requests to another one of many servers, and returns the result from the server that actually processed the request to the client. A forward proxy server allows multiple clients to route traffic to an external network. For instance, a business may have a proxy that routes and filters employees traffic to the public Internet. A reverse proxy, on the other hand, routes traffic on behalf of multiple servers. Moreover, a reverse proxy effectively serves as a gateway between clients, users and application servers. It handles all the access policy management and traffic routing, and it protects the identity of the server that actually processes the client's request.

Forward proxies can be divided into different types depending on what functions are provided or what servers are used. Proxies can also be divided into Residential Internet Protocol (IP) proxies, Datacenter IP proxies, and Mobile IP proxies. A Residential IP address is an address from the range specifically designated by the owning party as assigned to private customers. Usually, a Residential proxy is an IP address linked to a physical device, for example, a mobile phone or desktop computer, however businesswise the blocks of Residential IP addresses may be bought from the owning Proxy Service Provider by another company directly, in bulk. The real owners of the Residential IP address ranges, namely Internet service providers (ISPs), register residential IP addresses in public databases, which allows websites to determine a device's internet provider, network, and location. Datacenter IP proxy is the proxy server assigned with a datacenter IP. Datacenter IPs are IPs owned by companies, not by individuals. The datacenter proxies are actually IP addresses that are not located in a natural person's home. Instead, the data centre proxies are associated with a secondary corporation. Mobile IP proxies may be considered a subset of the Residential proxy category. A mobile IP proxy is essentially one IP address that is obtained from mobile operators. Mobile IP proxies use mobile data, as opposed to a residential proxy that uses broadband ISPs or home Wi-Fi.

Likewise, exit node proxies, or simply exit nodes, are proxies, and through these proxies, the request from the user (or the entry node) reaches the Internet. There can be several proxies used to perform a user's request, but the exit node proxy is the final proxy that contacts the target and forwards the information from the target to the queue to reach the user. In the current embodiments, proxies and exit nodes can be used as synonyms. The current embodiments are not limited only to the exit nodes and the same technologies can be used for the proxies. However, the term exit node is employed in the current description to clarify the technical differences between exit nodes and proxies. Inherently the exit node device is external to the proxy service provider infrastructure, usually belonging to a private customer e.g. a smartphone, a computer, a TV, or another Internet-enabled electronic device.

Classifications of proxy servers are also done based on protocols on which a particular proxy may operate. For instance, HTTP proxies, SOCKS proxies and FTP proxies are some of the protocol-based proxy categories. The term HTTP stands for Hypertext Transfer Protocol, the foundation for any data exchange on the Internet. Over the years, HTTP has evolved and extended, making it an inseparable part of the Internet. HTTP allows file transfers over the Internet and, in essence, initiates the communication between a client/user and a server. HTTP remains a crucial aspect of the World Wide Web because HTTP enables the transfer of audio, video, images, and other files over the Internet. HTTP is a widely adopted protocol currently available in two different versions—HTTP/2 and the latest one—HTTP/3.

Similarly, SOCKS is another internet protocol, and the term SOCKS stands for Socket Secure and is commonly used for traffic-intensive tasks, like content streaming or P2P sharing. SOCKS uses a TCP connection that is designed to send and receive data packets across the Internet, as well as to guarantee successful delivery of resources over networks. SOCKS5 is the latest edition of the SOCKS protocol. Compared with the older versions, SOCKS5 supports TCP or UDP connections and provides enhanced security.

Likewise, the term FTP stands for file transfer protocol and is a process that involves the transfer of files between devices over a network. The process works when one party allows another to send or receive files over the Internet. Originally used as a way for users to communicate and exchange information between two physical devices, FTP is now commonly used to store files in the cloud, which is usually a secure location that is held remotely.

HTTP proxy can act as a high-performance proxy content filter. Similar to other proxies, HTTP proxy works as an intermediary between the client browser and the destination web server. HTTP proxy can save much bandwidth through web traffic compression, caching of files and web pages from the Internet. Here, bandwidth refers to the amount of data that can be transferred from one point to another within a network in a specific amount of time. Typically, bandwidth is expressed as a bitrate and measured in bits per second (bps). HTTP proxy is a feasible option for companies that need to access ad-heavy websites. Furthermore, HTTP proxies allow many users to utilize the connection concurrently, making HTTP proxies useful for companies with a large number of employees. In short, HTTP proxies can be understood as an HTTP tunnel, i.e., a network link between devices with restricted network access.

The next type of proxy is the SOCKS proxy; SOCKS refers to an Internet protocol that allows one device to send data to another device through a third device. In other words, this device would be called a SOCKS server or a SOCKS proxy. Specifically, a SOCKS proxy creates a connection to any other server that stands behind a firewall and exchanges network packets between the client and the actual server. SOCKS proxies are usually needed where a TCP connection is prohibited, and data can be reached only through UDP. SOCKS proxies are a tool that allows for a specific way to connect to the Internet. SOCKS5 is the latest version of the SOCKS protocol. The difference between SOCKS5 and older versions is improved security and the ability to support UDP traffic. SOCKS proxies are often used for live calls or streaming. Streaming websites commonly use UDP to send data and currently, SOCKS is the main type of proxies that can handle a UDP session. In order to use a SOCKS proxy, the user's device must have the capability to handle SOCKS protocol and must be able to operate and maintain a SOCKS proxy server. The main problem with SOCKS proxies is that the protocol does not have standard tunnel encryption. Since the SOCKS request carries data in cleartext, SOCKS proxies are not recommended for situations where "sniffing" is likely to occur.

Similar to HTTP and SOCKS, the term FTP refers to one of the protocols used to move files on the Internet. The term FTP stands for File Transfer Protocol. In FTP, a control connection is used to send commands between an FTP client and an FTP server. However, the file transfers occur on a separate connection called the data connection. The FTP proxy can offer enhanced security for uploading files to another server. Moreover, the FTP proxy typically offers a cache function and encryption method, making the transmission process secure and safe from hackers.

Modern proxy servers do much more than simply forward web requests. Proxy servers act as a firewall and web filter, provide shared network connections, and cache data to speed up common requests. Proxy servers can provide a high level of privacy. Proxy servers can also be used to control the internet usage of employees and children (e.g., organizations and parents set up proxy servers to control and monitor how their employees or kids use the Internet) or improve browsing speed and save bandwidth. Proxies can be used to bypass certain Internet restrictions (e.g. firewalls) by enabling a user to request the content through a (remote) proxy server instead of accessing the content directly. Proxy servers are often used to get around geo-IP based content restrictions. If someone wants to get content from, for example, a US webpage, but they do not have access from their home country, they can make the request through a proxy server that is located in the USA (and has a US IP address). Using proxy services, the user's traffic seems to be coming from the USA IP address. Proxies can also be used for web scraping, data mining, and other similar tasks.

In computer networking, an HTTP request is made by a client to a host server in order to access/receive one or more resources. A client can request any form of resource such as multimedia files, text files, HTML pages, JSP files, archived data, etc. In order to send an HTTP request, the client uses the components of a URL (Uniform Resource Locator), which contains the necessary information to access the resources on the host server properly. Briefly, a URL is defined as any character string that identifies a resource on a network. A URL is used when a web client makes a request to a server for a resource.

To send an HTTP request, the client uses components of a URL that includes the information needed to access the resource. A rightly composed HTTP request comprises the following elements:
 a. a request line;
 b. a series of HTTP headers or header fields;
 c. a message-body if needed.

The request line is the first line in an HTTP request message and consists of at least three items:
 a. A 'method'. The 'method' is a single-word command that informs the server of what must be done with a particular resource. For example, the server could be asked to send a specific resource to the client.
 b. The path component of the URL for the request. The path identifies the resource on the server.
 c. The HTTP version number, showing the HTTP specification to which the client has tried to make the message comply.

The request line may also include a few additional items such as a query string and the scheme and the host components of the URL. A query string provides a string of information that informs the server about the purpose of certain resources. The query string is written after the path and is preceded by a question mark.

HTTP headers are written on a message to provide the recipient server with information about the message, the client, and how the client wants to communicate with the server. Each HTTP header is made up of a name and a value. The HTTP protocol specifications define the standard set of HTTP headers and describe the proper ways to use these headers. HTTP messages can also include extensions headers, which are not part of the HTTP/1.1 or HTTP/1.0 specifications. In brief, the HTTP headers for a client's request contain information that a server can use to decide how to respond to the request.

The message of an HTTP request can also be referred to as an entity-body. Technically, the entity-body is the actual content of the message. The entity-body can be in its original state or encode in a specific way for transmission, such as being broken into chunks (chunked transfer-encoding). Message bodies are appropriate for some request methods and inappropriate for others. For example, a request with the POST method, which sends input data to the server, has a message body containing the data. A request with the GET method, which asks the server to send a resource, does not have a message body.

In information technology, when developing distributed systems or services, one of the main challenges is handling data exchange between several systems. The concept of message-driven architecture promotes the idea of sharing data in the form of messages and is one of the efficient approaches to handle data exchange in a distributed system or services. The approach of message-driven architecture has several benefits. One of the primary advantages of implementing message-driven architecture is that it ensures the minimum coupling between applications since the exchange of messages is usually asynchronous. Moreover, instead of having the control flow dictated from the source system with messages, inversion of control is achieved when any application can consume or receive the messages and react independently. In addition, utilizing the method of message-driven architecture can aid in scaling the distributed systems or services with additional functionalities without difficulties.

Returning to the topic of proxies, modern proxy servers provide several functionalities to their clients apart from online anonymity. For example, proxy servers can act as a firewall and web filter, provide shared network connections, and cache data to speed up common requests. Proxy servers can provide a high level of privacy.

Furthermore, proxies can be employed to circumvent certain Internet restrictions (e.g. firewalls) by enabling a client to request the content through a (remote) proxy server instead of accessing the content server directly. In simple terms, proxy servers are often used to get around geo-IP based content restrictions. However, in recent times, proxy servers are being used extensively for web scraping, data mining and other related tasks.

In computer networking, authentication is the process of identifying clients that request access to a system, network, service, or device. In general, a proxy client is required to provide authentication credentials whenever the client approaches a proxy service provider. In response, the proxy service provider verifies and grants permissions depending on the authorization data to access the services offered by the proxy service provider. The authentication process often determines a client's identity according to credentials like username and password. Other authentication methods like multi-factor authentication, certificate-based authentication, token-based authentication are also used to authenticate client identity. A username is a unique string of characters or digits directly related to the client entity, whether a human, a device, or a program. A password is a confidential phrase known only to the client and not directly known to the system or the service provider, but directly related to the username. Therefore, for a client to access the services of a proxy service provider, the client must provide a valid username and password pair.

In the most general sense, authorization is the process of determining a client's privileges or access levels in relation to a system resource, including computer programs, files, services, data and application features. Authorization is normally preceded by authentication for client identity verification. One must understand that authentication is not authorization, but to be authorized, a client must be authenticated in the first place.

The procedures of authentication and authorization are collectively known as access control in the sphere of computer technology. The primary purpose of access control procedures is to identify, authenticate, and authorize clients and/or client entities by evaluating required login credentials, including passwords, personal identification numbers (PINs), biometric scans, security tokens, or other authentication factors. Access control aims to minimize the security risk of unauthorized access to physical and/or logical systems. Access control is a fundamental component of security compliance programs that ensures security and safety in many IT environments. Most organizations have infrastructure and procedures that limit access to networks, computer systems, applications, files, services, and other sensitive data.

Access control systems and procedures are complex and difficult to manage in dynamic IT environments that involve on-premises systems and cloud services. In the same context, managing and implementing effective access control systems and/or policies can always be resource-intensive and challenging for most proxy service providers. The challenges associated with access control are due to the highly distributed nature of the modern proxy service environments. Centralizing user directories and avoiding application/system-specific silos can add to the challenges of managing dynamically distributed proxy service environments. Other challenges associated with access control in a proxy service environment include data governance, compliance visibility, password fatigue, etc.

Besides access control, regulating proxy clients' data usage limits can be another challenge for proxy service providers. In a dynamically distributed proxy service environment, storing, checking and regulating the data usage limits of multiple clients can be resource-intensive that can lag the overall performance of the proxy services.

Therefore, there is a necessity for effective systems and methods that provide the implementation of localized access control systems to supplement the efficiency of proxy services. Also, there is a need for systems and methods to improve the regulation of data usage limits of proxy clients. The present embodiments disclosed herein provide at least the following solutions: a) systems and methods to manage and implement localized access control procedures; b) systems and methods to regulate data usage limits of multiple proxy clients.

SUMMARY

The summary provided herein presents a general understanding of the exemplary embodiments disclosed in the detailed description accompanied by drawings. Moreover, this summary is not intended, however, as an extensive or exhaustive overview. Instead, the only purpose of this summary is to present the condensed concepts related to the exemplary embodiments in a simplified form as a prelude to the detailed description.

The present embodiment features systems and methods to verify and authorize one or more proxy clients by utilizing the data saved previously within the memory of proxy servers. Especially, the embodiments disclosed herein provide systems and methods that enable a proxy server to gather and save authorization information of one or more clients within its memory and its internal persistent storage. Therefore, the proxy server is able to perform verification and authorization of one or more clients without the aid of any external database that supplies clients' metadata. Furthermore, the embodiments disclosed herein provide systems and methods to measure and report the amount of web traffic associated with one or more client devices. In addition, the embodiments provide systems and methods to check whether one or more client devices has reached a permissible amount of web traffic limit. By analyzing this limitation, the method can ensure the stability of the proxy speed and reliability that only authorized clients get access to the proxy services.

DETAILED DESCRIPTION

Figure 1:
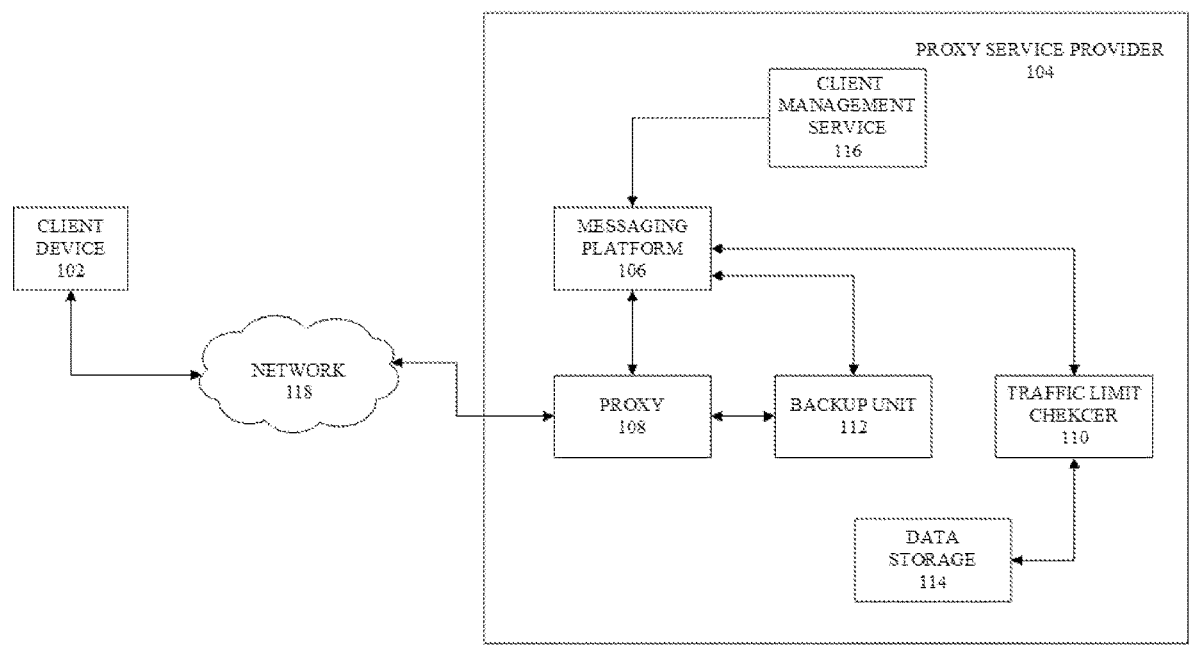
FIG. 1 shows a block diagram of an exemplary architectural depiction of various elements of the embodiments disclosed herein.

The following detailed description sets forth several details to provide a comprehensive understanding of the disclosed exemplary embodiments. However, one must appreciate that the exemplary embodiments may be implemented or practised without certain details disclosed herein. In addition, standard or well-known methods, procedures, components and/or systems have not been described in detail so as not to obscure the crucial parts of the disclosed exemplary embodiments.

However, some general terminology descriptions may be helpful and are included herein for convenience and are intended to be interpreted in the broadest possible interpretation. Elements that are not imperatively defined in the description should have the meaning as would be understood by a person skilled in the art. Moreover, the following detailed description provides insight into the embodiments of the claims and should not be taken as limiting the claims with regard to alternative embodiments that are not explicitly described herein.

Client device 102 according to the embodiments of the current disclosure may be any suitable client computing device including, but not limited to, a smartphone, a tablet computing device, a personal computing device, a laptop computing device, a gaming device, a vehicle infotainment device, an intelligent appliance (e.g., smart refrigerator or smart television), a cloud server, a mainframe, a notebook, a desktop, a workstation, a mobile device, or any other electronic device used for requesting resources from one or more web targets and/or accessing proxy service providers. Additionally, it should be noted that the term "client" is being used in the interest of brevity and may refer to any of a variety of entities that may be associated with a subscriber account such as, for example, a person, an organization, an organizational role within an organization and/or a group within an organization.

Proxy service provider 104 (PSP 104) can be a combination of elements comprising the platform that offers proxy services to one or more client devices 102. In general, clients can subscribe or purchase proxy services offered by the proxy service provider 104. In the exemplary embodiments discussed herein, the proxy service provider 104 comprises messaging platform 106, proxy 108, traffic limit checker 110, backup unit 112 data storage 114 and client management service 116. However, one must understand that PSP 106 can comprise several other elements or a combination of elements necessary to process, analyze and execute clients' multiple requests through an appropriate proxy server against one or more web targets.

Messaging platform 106 is an element of the proxy service provider 104 and can be any framework implementation of an enduring message streaming system. Messaging platform 106 in one aspect, acts as a middleware tool that enables elements of the proxy service provider 104 to communicate amongst themselves and exchange information. Messaging platform 106 aims to provide a unified, high-throughput, low-latency message streaming platform for handling real-time data communications. Messaging platform 104 may comprise, among other things, a plurality of sections dedicated to multiple categories of data feeds/messages. Elements (i.e., the elements of the proxy service provider 104) having access to the aforementioned sections of the messaging platform 106 can transmit data feeds/messages to respective sections of the messaging platform 106. The aforementioned data feeds/messages are queued up in their respective sections of the messaging platform 106. Furthermore, the elements (i.e., the elements of the proxy service provider 104) having access to the aforementioned sections of the messaging platform 106 can consume or obtain the necessary queued up data feeds/messages.

Proxy 108 is an element of the proxy service provider 104, primarily responsible for delegating and executing a plurality of requests originated from one or more client devices 102. Specifically, proxy 108 can execute requests from one or more client devices 102 against specific web target(s). In some embodiments, proxy 108 can forward the requests originated from one or more client device 102 to exit node(s) or last-mile proxy to execute such requests successfully against specific web target(s). It must also be understood that proxy 108 can deny the execution of the requests originated from one or more client devices 102 if certain conditions are not met (such as if authentication and/or authorization process is unsuccessful and/or if client device(s) 102 has reached maximum traffic limit). In the embodiments disclosed herein, proxy 108 comprises, among other things, memory (such as, for example, random access memory (RAM)) and an internal persistent storage. However, in some embodiments, proxy 108 may be coupled with an external persistent storage. Another feature of proxy 108 is that it can measure and report the utilized traffic of one or more client devices 102 to the messaging platform 106. The term 'utilized traffic' or 'client's utilized traffic' as used in this disclosure refers to the quantity of traffic (incoming and outgoing web traffic) currently consumed by a particular client device 102. The utilized traffic is expressed as transmission rate in terms of bytes per specific time unit. It must be mentioned that the internal storage unit present within proxy 108 is a kind of persistent storage that can retain data even after power shutdowns. Traffic is counted by the traffic limit checker 110. It consumes all clients' made requests, aggregates, sums up traffic and also checks if limits are reached.

Traffic limit checker 110 is an element of the proxy service provider 104 and is responsible for checking whether the utilized traffic of one or more client devices 102 has reached or exceeded their respective permissible traffic limit. Permissible traffic limit denotes the maximum amount of web traffic (i.e., web data transmission and exchange) permitted to a client device 102. Traffic limit checker 110 comprises a memory (such as for example, a random access memory (RAM)).

Backup unit 112 can be any storage device, medium or facility responsible for storing copies and instances of essential data such as but not limited to authorization information of one or more client devices 102. In the embodiments described herein, backup unit 112 is an element of the proxy service provider 104 and can access messaging platform 106 in order to obtain the aforementioned essential data. Backup unit 112 provides redundancy of essential data necessary for proxy 108 to execute the proxy request originated from the client device 102. In brief, backup unit 112 enables the maintenance, management, retrieval and restoration of the aforementioned essential data.

Data storage 114 is an element of the proxy service provider 104 and comprises a collection of data or information. Data within the data storage 112 are arranged into rows and columns in a series of tables to make processing and data querying efficient. In embodiments described herein, data storage 114 facilitates the storage of traffic limit metadata of one or more client devices 102. Traffic limit checker 110 populates the data storage 114 with traffic limit information of one or more client devices 102 at regular intervals.

Client management service 116 is an element of proxy service provider 104 and is primarily responsible for transmitting authorization and traffic limit information of one or more clients to messaging platform 106. The authorization information can comprise but is not limited to client ID, authentication credentials and status indicators. Likewise, the traffic limit information can comprise client ID and permissible traffic limit. Client management service 116 can comprise interface(s) to receive the aforesaid information (i.e., authorization and traffic limit information) from one or more elements and/or applications and/or facilities external to proxy service provider 104; for example client APIs or system administrators. Additionally, in some embodiments client management service 116 can receive and transmit among other things, a plurality of information to messaging platform 106 such as but not limited to policy settings, default security settings, account information, support APIs.

Network 118 is a digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Internetwork, Internet.

FIG. 1 shows a block diagram of an exemplary architectural depiction of various elements of the embodiments disclosed herein. FIG. 1 shows a single instance of client device 102, proxy service provider 104 and network 118. However, in actuality, there can be a plurality of client devices 102 approaching one or more proxy service providers 104 via network 118. Further, in FIG. 1, proxy service provider 104 comprises, among other elements, messaging platform 106, proxy 108, traffic limit checker 110, backup unit 112, data storage 114 and client management service 116. One of the ordinary skills in the art will understand that proxy service provider 106 can comprise other elements or a combination of elements (not shown or described) necessary to process, analyze and execute clients' multiple proxy requests through appropriate proxy servers against one or more web targets.

While the elements shown in FIG. 1 implement the exemplary embodiment, some elements in other embodiments can have different titles or be combined into a single element instead of two separate elements. However, the functionality of the elements and the flow of information between the elements are not impacted by such combinations or consolidations. Therefore, FIG. 1, as shown, should be interpreted as exemplary only and not restrictive or exclusionary of other features, including features discussed in other areas of this disclosure.

Within proxy service provider 104, proxy 108, backup unit 112, traffic limit checker 110 and client management service 116 are communicably connected with messaging platform 106. Proxy 108 is communicably coupled with backup unit 112. Likewise, traffic limit checker 110 is communicably coupled with data storage 114.

In FIG. 1, network 118 can be local area networks (LANs), wide-area networks (WANs), campus-area networks (CANs), metropolitan-area networks (MANs), home-area networks (HANs), Intranet, Extranet, Internetwork, Internet. However, the Internet is the most relevant network for the functioning of the present embodiment. Connection to network 118 may require that client device 102, proxy 108 execute software routines that support the implementation of, for example, TCP/IP communications.

Referring to FIG. 1, in one aspect, client management service 116 transmits the client's authorization and traffic limit information to messaging platform 106. However, prior to executing the transmission described above, it must be remembered that client management service 116 may receive the authorization and traffic limit information from one or more elements and/or applications and or/facilities external to proxy service provider 104 (not shown). The client's authorization information comprises, but is not limited to:

a. client ID
b. authentication credentials
c. status indicator

Client ID refers to a unique identifier necessary for the elements of the proxy service provider 104 to identify the owner/user of the client device 102 (i.e., the client). For example, the client ID can be a 64-bit integer or 64 characters UID (Unique Identifier). In present embodiments, proxy service provider 104 generates and assigns client IDs to clients upon purchasing or subscribing to the services of the proxy service provider 104.

The authentication credentials in the above list can be the username and password combination of the client. It must be understood that the combination of username and password are collectively referred to as the client's authentication credentials.

The status indicator gives information on whether the proxy request(s) originated from the client device 102 can be serviced (i.e., executed) or declined. Status indicator, for example, can either be set as 'active' or 'disabled' by, for example, the client API initially. Furthermore, the term 'proxy request(s)' as used herein refers to request(s) originating from the client device 102 seeking web resources from one or more web targets.

As mentioned previously, in addition to the authorization information, client management service 116 also transmits the client's traffic limit information to messaging platform 106. The client's traffic limit information comprises, but is not limited to:

a. client ID
b. permissible traffic limit

Client ID in the above list is coequal to the one described earlier. It is a unique identifier necessary for the elements of the proxy service provider 104 to identify the owner/user of the client device 102 (i.e., the client). For example, the client ID can be a 64-bit integer or 64 characters UID (Unique Identifier).

Permissible traffic limit denotes the maximum amount of web traffic (i.e., web data transmission and exchange) permitted to the client device 102. The permissible traffic limit is expressed as transmission rates in bytes per specific time unit in the current embodiments.

It should be mentioned that the term 'client's authorization information' and the term 'authorization information' are interchangeably used in the present disclosure. Likewise, the term 'client's traffic limit information' and the term 'traffic limit information' are interchangeably used in the present disclosure.

The client's authorization information transmitted to the messaging platform 106 is queued up in a section of the messaging platform 106 reserved for the authorization data feed. Likewise, the client's traffic limit information transmitted to the messaging platform 106 is queued up in another section of the messaging platform 106 reserved for the traffic limit data feed. It must be recalled that messaging platform 106 comprises several sections dedicated to multiple categories of data feeds/messages.

Consequently, proxy 108 consumes or obtains the authorization information from messaging platform 108. Thereafter, proxy 108 places the authorization information within its memory, thereby saving the authorization information in its memory. As mentioned previously, proxy 108, comprises a memory, such as for example random access memory (RAM). Furthermore, proxy 108 transfers the authorization information to its internal persistent storage at a fixed time interval. It should also be remembered that in the current embodiments, proxy 108, also holds an internal persistent storage. However, in some embodiments, proxy 108 may be coupled with an external persistent storage. In such embodiments, proxy 1018 transfers the authorization information to the coupled external persistent storage (not shown).

Concurrently, traffic limit checker 110 consumes or obtains the traffic limit information from messaging platform 106. Thereafter, traffic limit checker 110 places the traffic limit information within its memory thereby saving the traffic limit information in its memory. As described earlier, traffic limit checker 110, comprises a memory, such as for example random access memory (RAM). Furthermore, traffic limit checker 110 transfers the traffic limit information to the data storage 114 at a fixed time interval.

It must be understood that only for illustrative purposes, FIG. 1 shows support system 116 transmitting authorization and traffic limit information to the messaging platform 106. However, in actual implementation of the current embodiments, support system 116 can transmit multiple authorization and traffic limit information to the messaging platform 106. In the same context, proxy 108 can consume or obtain multiple authorization information and save such information within its memory. Furthermore, proxy 108 can also transfer multiple authorization information to its internal persistent storage. In some embodiments, proxy 108 may be coupled with an external persistent storage, in such embodiments, proxy 108 can transfer multiple authorization information to the coupled external persistent storage.

Similarly, traffic limit checker 110 can consume or obtain multiple traffic limit information from messaging platform 106 and save such information within its memory. In the same context, traffic limit checker 110 can also transfer multiple traffic limit information to the data storage 114 at fixed time intervals.

Thus from the systems and methods described above, one could understand the manner in which proxy 108 and traffic limit checker 110 are enabled to save authorization and traffic limit information within its memory and store the same in its internal storage unit.

Referring to FIG. 1, in yet another aspect, client device 102 sends a proxy request seeking resource(s) from a specific web target to proxy 108 via network 118. Client device 102, prior to sending the proxy request, establishes a network communication channel with proxy 108 via network 118 in coherence with standard network communication protocols such as but not limited to HTTP. In computing, network communication protocol refers to a system of rules that enables two or more entities in a network to exchange information. Network communication protocols define rules, syntaxes, semantics, and possible error recovery methods for communication between network entities. The proxy request sent by client device 102 comprises but is not limited to a target URL, request parameters, and authentication credentials of the client (i.e., the owner/user of the client device 102).

Proxy 108 receives the proxy request and verifies the authentication credentials of the client. The authorization information placed (i.e., saved) previously in the memory of proxy 108 comprises, among other things, the authentication credentials of the client. Therefore, proxy 108 retrieves the authentication credentials from its memory and compares them with the authentication credentials received as part of the proxy request from client device 102.

After successful verification, proxy 108 reads the status indicator that was placed (i.e., saved) within its memory as part of the authorization information. Proxy 108 authorizes the client and proceeds to service the client device 102 only if the status indicator is set as 'active'. However, if the status indicator is set as 'disabled', proxy 108 denies services and sends an error message to the client device 102.

To elaborate further, suppose the status is set as 'active'; in such instances, proxy 108 executes the proxy request against a specific web target via network 118. In some embodiments, proxy 108 can also delegate the proxy request to an exit node or a last-mile proxy, which executes the proxy request against a specific web target via network 118. Pursuant to the execution of the proxy request, proxy 108 returns response data from the web target to client device 102 via the network 118.

Thus, from the above-described systems and methods, one could appreciate the manner in which proxy 108 verifies and authorizes client device 102 by utilizing the data saved previously within its memory. In other words, verification and authorization of the client device 102 are carried out without the aid of any external databases that supply the client's metadata. Further, the described systems and methods can increase proxy's 108 speed and reliability in authorizing the client device 102.

Proxy 108, in the course of executing the proxy request or delegating the proxy request, measures and reports the utilized traffic to messaging platform 106 at regular intervals. The term 'utilized traffic' as used herein refers to the amount of web traffic currently consumed by the client device 102. The utilized traffic is expressed as transmission rate in terms of bytes per specific time unit. It should be understood that the utilized traffic reported by proxy 108 is queued up in a section of the messaging platform 106 reserved for the utilized traffic data feeds/messages.

Consequently, traffic limit checker 110 consumes or obtains the utilized traffic from messaging platform 106. Thereafter, traffic limit checker 110 checks whether the utilized traffic is equal or greater than the permissible traffic limit. As previously defined, permissible traffic limit denotes the maximum amount of web traffic (i.e., web data transmission and exchange) permitted to the client device 102. The traffic limit information placed (i.e., saved) previously within the memory of the traffic limit checker 110 comprises, among other things, the permissible traffic limit. Therefore, traffic limit checker 110 retrieves the permissible traffic limit from its memory and compares it with the utilized traffic.

In the circumstance of utilized traffic being equal or greater than the permissible traffic limit, the traffic limit checker 110 sends a 'limit reached message' notifying that the client device 102 has reached the permissible traffic limit to the messaging platform 106. The limit reached message sent by traffic limit checker 110 is queued up in a section of the messaging platform 106 reserved for such messages from traffic limit checker 110. Thereafter, proxy 108 consumes or obtains the limit reached message from the messaging platform 106. Proxy 108 reads the limit reached message and instantly terminates executing or delegating the proxy request originated from the client device 102.

However, in some embodiments, in the circumstance of utilized traffic being equal or greater than the permissible traffic limit, the traffic limit checker 110 can adjust the permissible traffic limit permitted to the client device 102. Specifically, traffic limit checker 110 can increase the permissible traffic limit permitted to the client device 102. After increasing the permissible traffic limit, traffic limit checker 110 sends a 'limit increased message' to the messaging platform 106. The limit increased message sent by traffic limit checker 110 is queued up in a section of the messaging platform 106 reserved for such messages from traffic limit checker 110. Thereafter, proxy 108 consumes or obtains the limit increased message from the messaging platform 106. Proxy 108 reads the limit increased message and continues executing or delegating the proxy request originated from the client device 102.

It must be understood that FIG. 1 is only a flow exemplary diagram. In actuality, a plurality of client device 102 can approach proxy 108 with multiple proxy requests. Proxy 108 can verify and authorize a plurality of client devices 102. In the same context, proxy 108 can measure and report utilized traffic of multiple client devices 102 at regular intervals. Similarly, traffic limit checkers can consume and check utilized traffic of multiple client devices 102 at regular intervals.

Therefore, by the methods and systems described above, one can comprehend how the amount of web traffic currently consumed by the client device 102 is measured, reported and checked against the permissible traffic limit.

Referring to FIG. 1, in yet another aspect, backup unit 112 can frequently fetch and store the authorization information from messaging platform 106 within its storage facility. A person of ordinary skills in the art must understand that backup unit 112 provides redundancy of data necessary for proxy 108 to execute the proxy request originated from the client device 102. In simple terms, backup unit 112 provides, among other things, backing up of authorization information necessary for the proxy 108 to execute the proxy request originated from the client device 102. Accordingly, proxy 108 may fetch, on specific occasions, the authorization information from backup unit 112.

To elaborate, proxy 108, in some instances, (for example, starting up after a shutdown), can evaluate and determine the validity of authorization information stored in its internal persistent storage. Suppose, if the authorization information is invalid or outdated; on such specific occasions, proxy 108 may fetch the authorization information from backup unit 112. Specifically, proxy 108 may fetch and store the authorization information from backup unit 112 in its internal persistent storage. As mentioned previously, in some embodiments, proxy 108 may be coupled with an external persistent storage. In such embodiments, proxy 108 can evaluate and determine the validity of authorization information stored in the coupled persistent storage. Suppose, if the authorization information is invalid or outdated; on such specific occasions, proxy 108 may fetch the authorization information from backup unit 112. Specifically, proxy 108 may fetch and store the authorization information from backup unit 112 in the coupled external persistent storage.

Similarly, traffic limit checker 110, in some instances, (for example, starting up after a shutdown), can fetch traffic limit information from data storage 114 and places (i.e., saves) such information within its memory. This traffic limit information is then used while checking the utilized traffic of one or more client devices 102.

Figure 2:
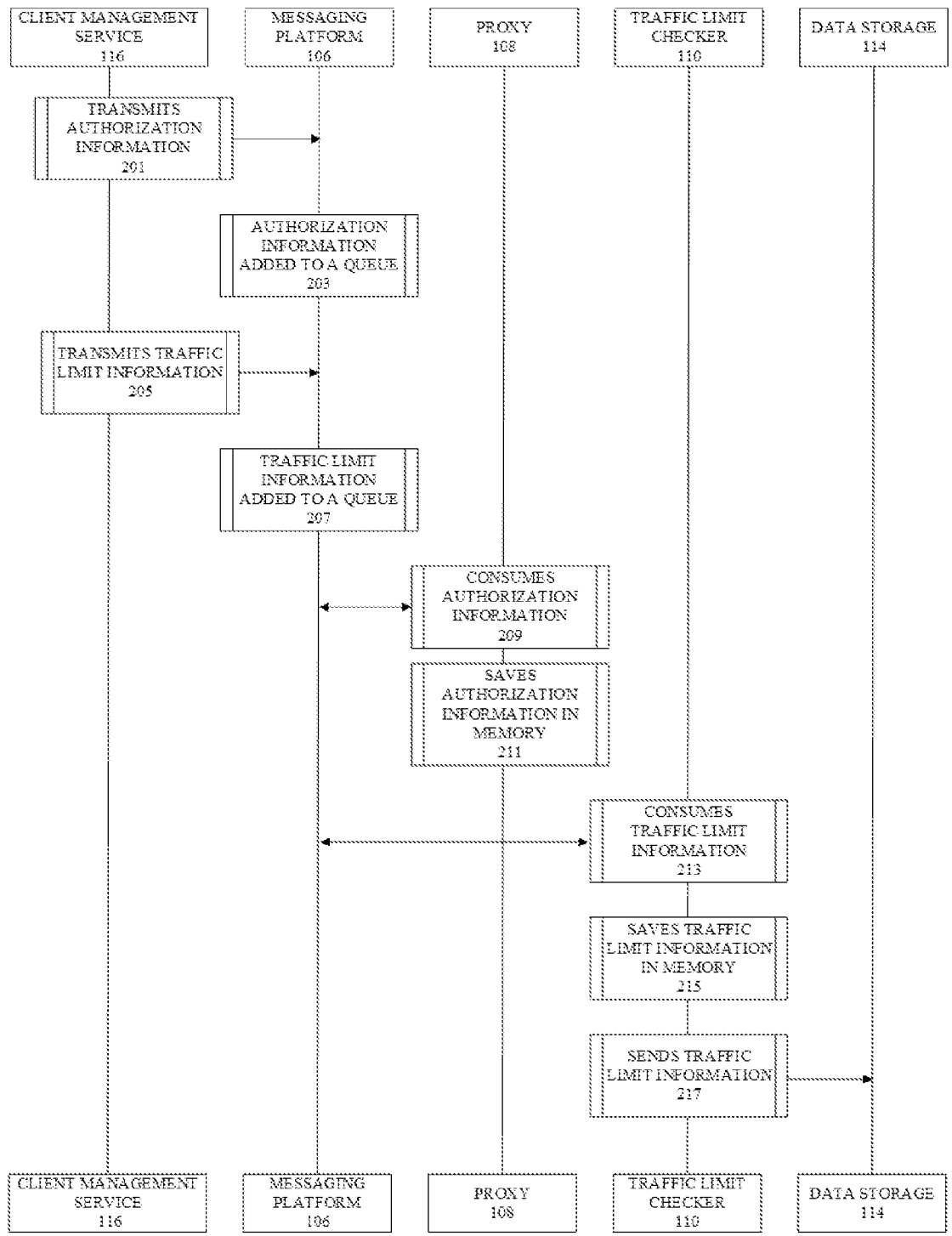
FIG. 2 is an exemplary flow diagram showing proxy 108 and traffic limit checker 110 saving the authorization and traffic limit information within their respective memories.

FIG. 2 is an exemplary flow diagram showing proxy 108 and traffic limit checker 110 saving the authorization and traffic limit information within their respective memories. In step 201, client management service 116 transmits the client's authorization information to messaging platform 106. Consequently, the transmitted authorization information is queued up in a section of the messaging platform 106 reserved for the authorization data feed (step 203). It must be recalled that messaging platform 106 comprises, among other things, several sections dedicated to multiple categories of data feeds/messages.

In step 205, the client management service 116 transmits the client's traffic limit information to messaging platform 106. However, a person of ordinary skills in the art must understand that client management service 116 can transmit the aforementioned authorization and traffic limit information in a single step instead of two consecutive steps as described above. Consequently, the transmitted traffic limit information is queued up in a section of the messaging platform 106 reserved for the traffic limit data feed (step 207). As previously mentioned, it must be recalled that messaging platform 106 comprises, among other things, several sections dedicated to multiple categories of data feeds/messages.

The client's authorization information transmitted by client management service 116 to the messaging platform 106 comprises, but is not limited to:

a. client ID
b. authentication credentials
c. status indicator

Client ID refers to a unique identifier necessary for the elements of the proxy service provider 104 to identify the owner/user of the client device 102 (i.e., the client). For example, the client ID can be a 64-bit integer or 64 characters UID (Unique Identifier). The term authentication credentials in the above list can be the username and password combination of the client. It must be understood that the combination of username and password are collectively referred to as the client's authentication credentials. Furthermore, the status indicator informs whether the proxy request(s) originated from the client device 102 can be serviced (i.e., executed) or declined. Status indicator, for example, can either be set as 'active' or 'disabled' by, for example, the client API initially.

Likewise, the client's traffic limit information transmitted by client management service 116 to the messaging platform 106 comprises, but is not limited to:

a. client ID
b. permissible traffic limit

Client ID in the above list is coequal to the one described earlier, a unique identifier necessary for the elements of the proxy service provider 104 to identify the owner/user of the client device 102 (i.e., the client). For example, the client ID can be a 64-bit integer or 64 characters UID (Unique Identifier). Permissible traffic limit denotes the maximum amount of web traffic (i.e., web data transmission and exchange) permitted to the client device 102. The permissible traffic limit is expressed as transmission rates in bytes per specific time unit in the current embodiments.

In step 209, proxy 108 consumes or obtains the authorization information from messaging platform 106. In step 211, proxy 108 places (i.e., saves) the authorization information within its memory. As mentioned previously, proxy 108, among other things, comprise a memory, such as for example random access memory (RAM). In addition, proxy 108 is configured to transfer the authorization information to its internal persistent storage at a fixed time interval. Accordingly, the internal persistent storage receives and stores the authorization information (not shown). In some embodiments, proxy 108 may be coupled with an external persistent storage. In such embodiments, proxy 108 is configured to transfer the authorization information to the coupled external persistent storage at a fixed time interval (not shown).

In step 213 traffic limit checker 110 consumes or obtains the traffic limit information from messaging platform 106. In the following step i.e., in step 215, traffic limit checker 110 places (i.e., saves) traffic limit information within its memory. As described earlier, traffic limit checker 110, comprises a memory, such as for example random access memory (RAM). In addition, traffic limit checker 110 is configured to transfer the traffic limit information to data storage 114 (step 217) at a fixed time interval. Accordingly, data storage 114 receives and stores the traffic limit information.

Thus from the systems and methods described above, one could understand the manner in which proxy 108 and traffic limit checker 120 are enabled to save authorization and traffic limit information within its memory and store the same in its internal storage unit and external storage unit (i.e., data storage 114) respectively.

Figure 3:
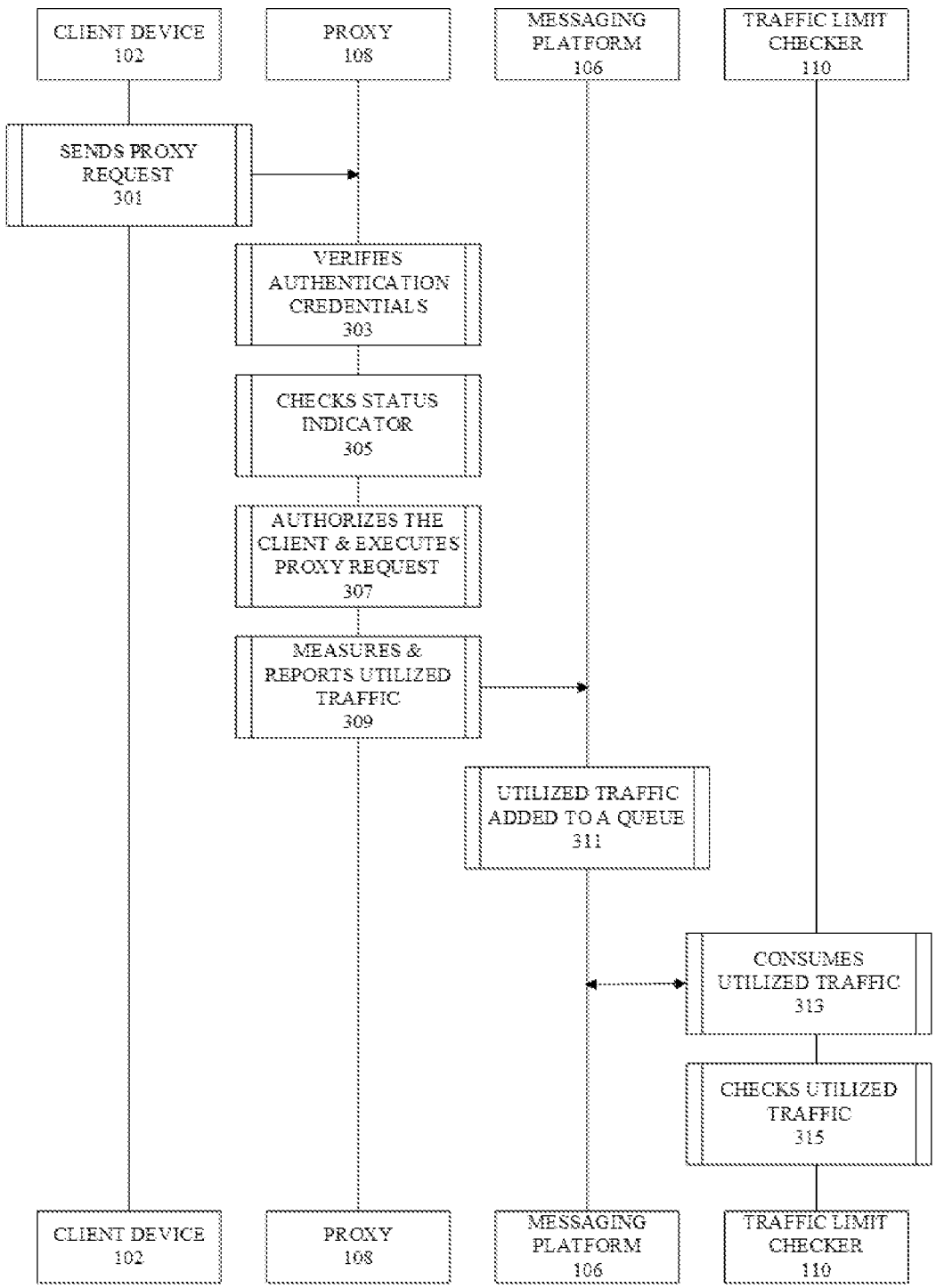
FIG. 3 is an exemplary flow diagram showing proxy 108 verifying and authorizing the client device 102 by utilizing the data saved previously within its memory. In addition, FIG. 3 also shows steps to measure and check the utilized traffic of client device 102.

FIG. 3 is an exemplary flow diagram showing proxy 108 verifying and authorizing the client device 102 by utilizing the data saved previously within its memory. In addition, FIG. 3 also shows steps to measure and check the utilized traffic of client device 102. In step 301, client device 102 sends a proxy request to proxy 108. The proxy request sent by client device 102 comprises but is not limited to a target URL, request parameters, and authentication credentials of the client (i.e., the owner/user of the client device 102). The term 'proxy request' as used herein refers to the request originating from client device 102 seeking web resources from one or more web targets.

In step 303, proxy 108 receives the proxy request and verifies the authentication credentials of the client received as part of the proxy request. However, the authorization information placed (i.e., saved) previously in the memory of proxy 108 comprises, among other things, the authentication credentials of the client. Therefore, proxy 108 retrieves the authentication credentials from its memory and compares them with the authentication credentials received as part of the proxy request originated from client device 102.

After successful verification of the authentication credentials, in step 305, proxy 108 reads (i.e., checks) the status indicator that was placed (i.e., saved) within its memory as part of the authorization information. Since FIG. 3 shows an instance in which the status indicator is set as 'active' therefore, in step 307, proxy 108 authorizes the client and executes the proxy request originated from the client device 102. However, if the status indicator is set as 'disabled', proxy 108 denies services and sends an error message to the client device 102.

Moreover, proxy 108 executes the proxy request against a specific web target via network 118. In some embodiments, proxy 108 can also delegate the proxy request to an exit node or a last-mile proxy, which executes the proxy request against a specific web target via network 118. Pursuant to the execution of the proxy request, proxy 108 can return response data from the web target to client device 102 via network 118.

Proxy 108, in the course of executing the proxy request, measures and reports the utilized traffic of the client device 102 to messaging platform 106 at regular intervals. Accordingly, in step 309, proxy 108 measures and reports the utilized traffic of the client device 102 to messaging platform 106. The term 'utilized traffic' as used in the current disclosure refers to the amount of web traffic currently consumed by the client device 102. The utilized traffic is expressed as transmission rate in terms of bytes per specific time unit. It should be understood that the utilized traffic reported by proxy 108 is queued up in a section of the messaging platform 106 reserved for the utilized traffic data feeds/messages (step 311).

In step 313, traffic limit checker 110 consumes or obtains the utilized traffic from messaging platform 106. Thereafter, in step 315, traffic limit checker 110 checks whether the utilized traffic is equal or greater than the permissible traffic limit. As previously defined, permissible traffic limit denotes the maximum amount of web traffic (i.e., web data transmission and exchange) permitted to the client device 102. The traffic limit information placed (i.e., saved) previously within the memory of the traffic limit checker 110 comprises, among other things, the permissible traffic limit. Therefore, traffic limit checker 110 retrieves the permissible traffic limit from its memory and compares it with the utilized traffic. It should be understood that traffic limit checker 110 consumes and checks the utilized traffic at regular intervals.

Figure 4:
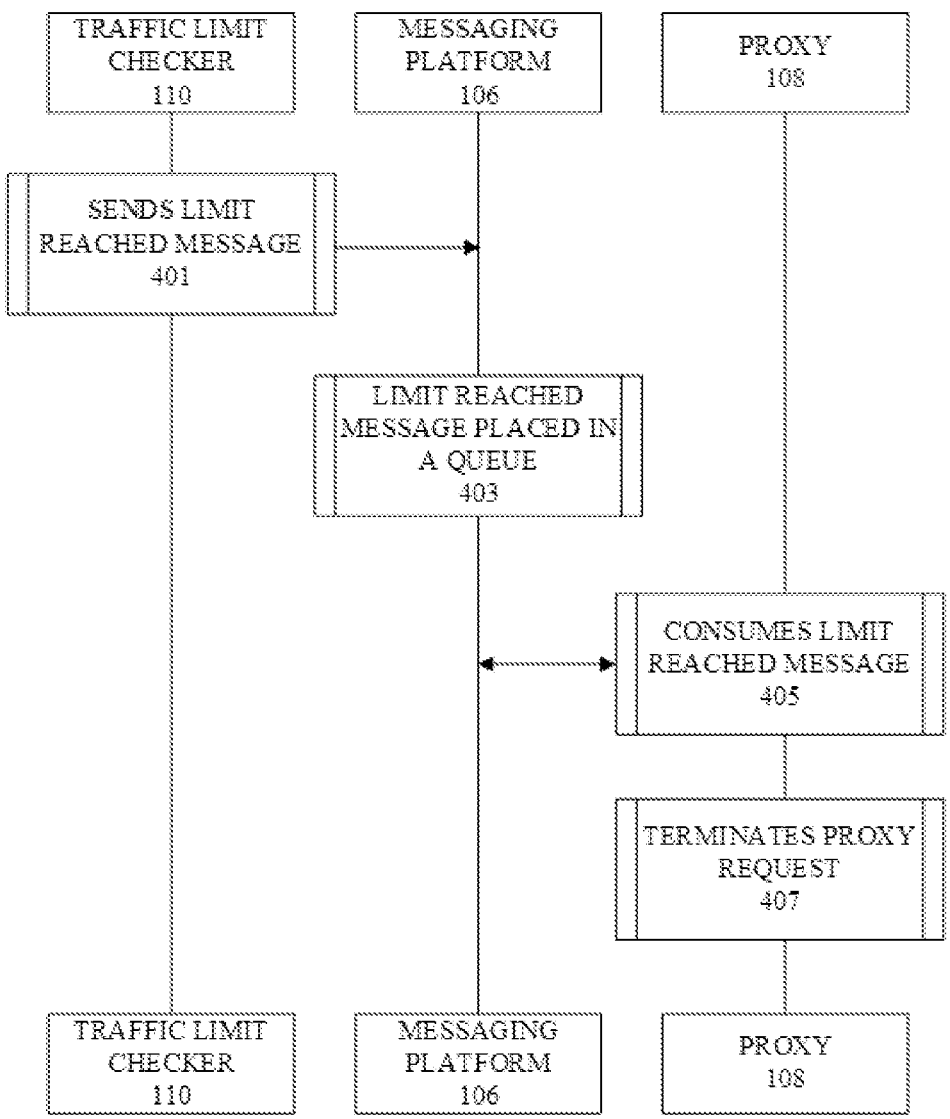
FIG. 4 is an exemplary flow diagram showing traffic limit checker 110 sending a 'limit reached message' to messaging platform 106.

FIG. 4 is an exemplary flow diagram showing traffic limit checker 110 sending a 'limit reached message' to messaging platform 106. As mentioned previously i.e., in step 311 that traffic limit checker 110 consumes and checks the utilized traffic of the client device 102 at regular intervals. Therefore, if the utilized traffic is found to be equal or greater than the permissible traffic limit; in such instances, traffic limit checker 110 sends a 'limit reached message' to messaging platform 106 (step 401). The limit reached message sent by the traffic limit checker 110 notifies that the client device 102 has reached the permissible traffic limit. Specifically, the limit reached message can comprise but is not limited to:

a. client ID
b. status indicator

Here, the traffic limit checker 110 sets the status as 'disabled' notifying that the execution of proxy request (originated from client device 102) must be terminated. It should be understood that the limit reached message sent by traffic limit checker 110 is queued up in a section of the messaging platform 106 reserved for such messages from traffic limit checker 110 (step 403).

In step 405, proxy 108 consumes or obtains the limit reached message from the messaging platform 106. Consequently, in step 407, proxy 108 reads the limit reached message, especially the status indicator and instantly terminates executing the proxy request originated from the client device 102.

Figure 5:
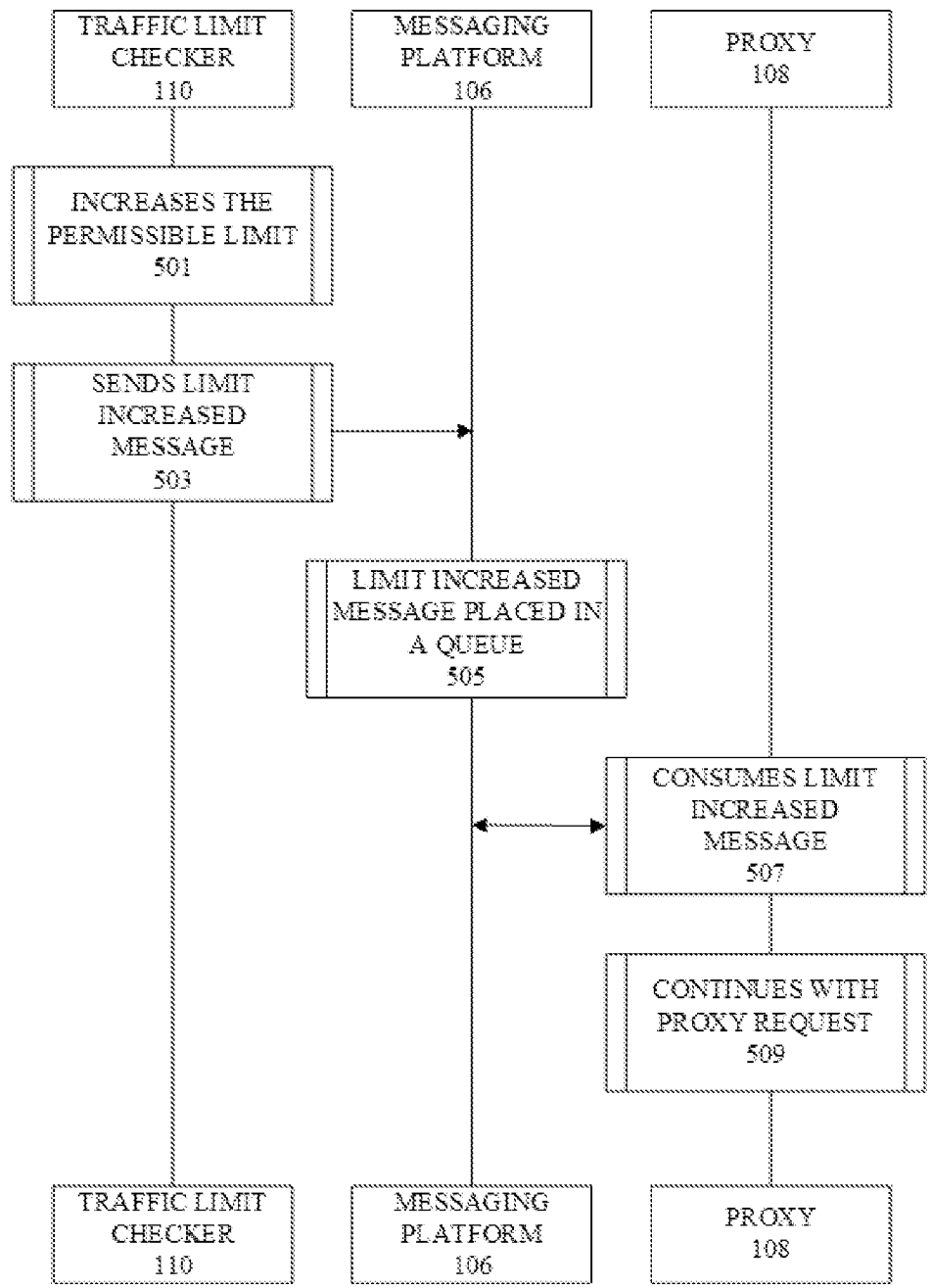
FIG. 5 is an exemplary flow diagram showing traffic limit checker 110 sending a 'limit increased message' to messaging platform 106.

As previously mentioned, in some embodiments, the traffic limit checker 110 can adjust the permissible traffic limit permitted to the client device 102. Specifically, traffic limit checker 110 can increase the permissible traffic limit permitted to the client device 102. FIG. 5 is an exemplary flow diagram showing traffic limit checker 110 sending a 'limit increased message' to messaging platform 106. As mentioned previously i.e., in step 311 that traffic limit checker 110 consumes and checks the utilized traffic of the client device 102 at regular intervals. Therefore, if the utilized traffic is found to be equal or greater than the permissible traffic limit; in such instances, traffic limit checker 110 increases the permissible traffic limit permitted to the client device 102 (step 501). After increasing the permissible traffic limit permitted to the client device 102, traffic limit checker 110 sends a 'limit increased message' to messaging platform 106 (step 503). The limit increased message sent by traffic limit checker 110 comprises but not limit to: a) client ID; b) status indicator.

Here, the traffic limit checker 110 sets the status indicator as 'active' notifying that the execution of the proxy request (originated from the client device 102) can be continued. It should be understood that the limit reached message sent by traffic limit checker 110 is queued up in a section of the messaging platform 106 reserved for such messages from traffic limit checker 110 (step 505).

In step 507, proxy 108 consumes or obtains the limit increased message from the messaging platform 106. Consequently, in step 509, proxy 108 reads the limit increased message, especially the status indicator and continues to execute proxy request originated from the client device 102.

Figure 6:
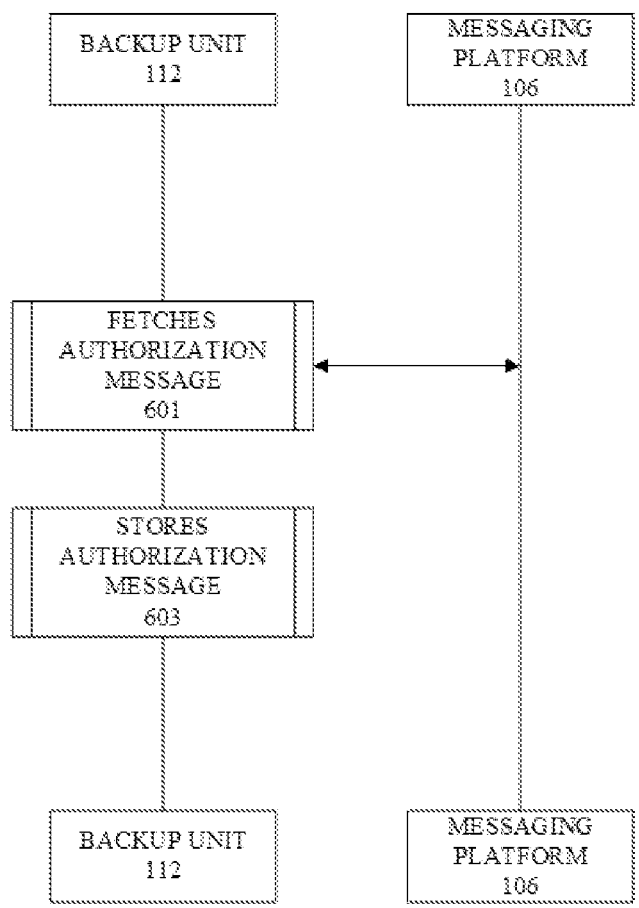
FIG. 6 is an exemplary flow diagram showing backup unit 112 storing, among other things, the authorization information of one or more client devices 102.

FIG. 6 is an exemplary flow diagram showing backup unit 112 storing, among other things, the authorization information of one or more client devices 102. In step 601, backup unit 112 accesses the messaging platform 106 and fetches, among other things, the authorization information of client device 102. Subsequently, in step 603, backup unit 112 stores the authorization information within its storage capacity.

Figure 7:
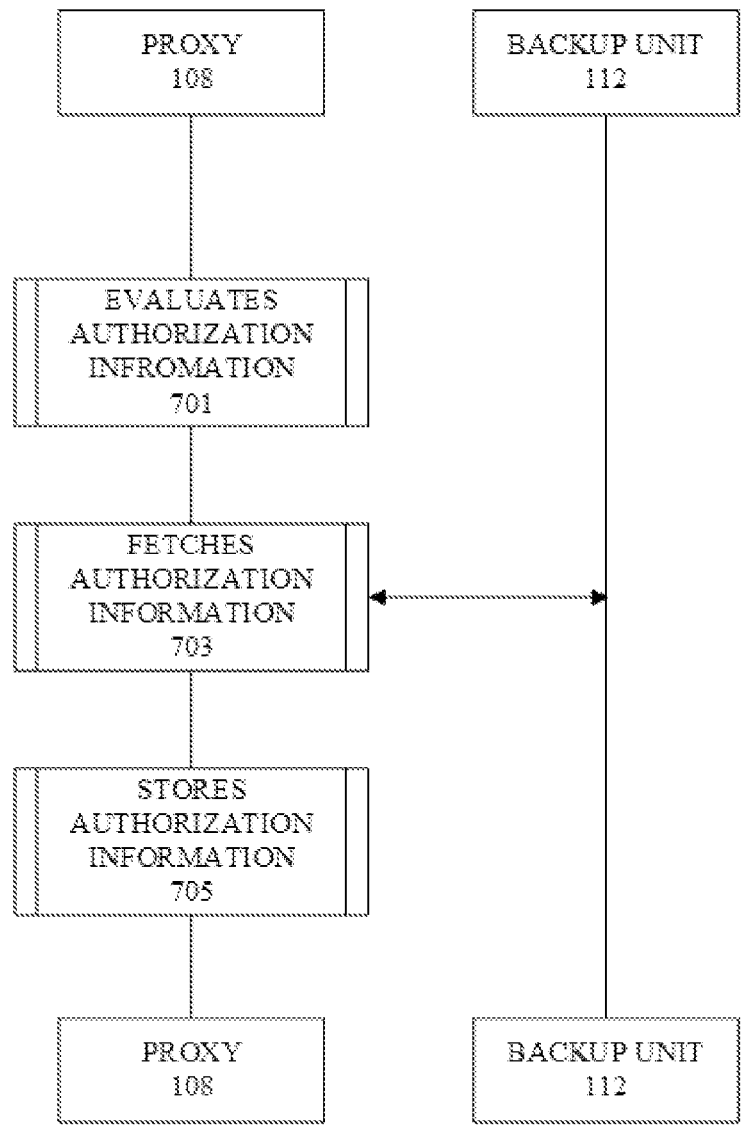
FIG. 7 is an exemplary flow diagram showing proxy 108 fetching authorization information from backup unit 112.

FIG. 7 is an exemplary flow diagram showing proxy 108 fetching authorization information from backup unit 112. Proxy 108, in some instances (for example, starting up after a shutdown), can evaluate and determine the validity of authorization information stored in its internal persistent storage. Accordingly, in step 701, proxy 108 evaluates and determines the validity of authorization information stored in its internal persistent storage. FIG. 7 shows a specific occasion in which the authorization information stored in the internal persistent storage of proxy 108 is invalid or outdated. Therefore, in step 703, proxy 108 fetches authorization information from backup unit 112. Subsequently, in step 705, proxy 108 stores the fetched authorization information in its internal persistent storage.

Figure 8:
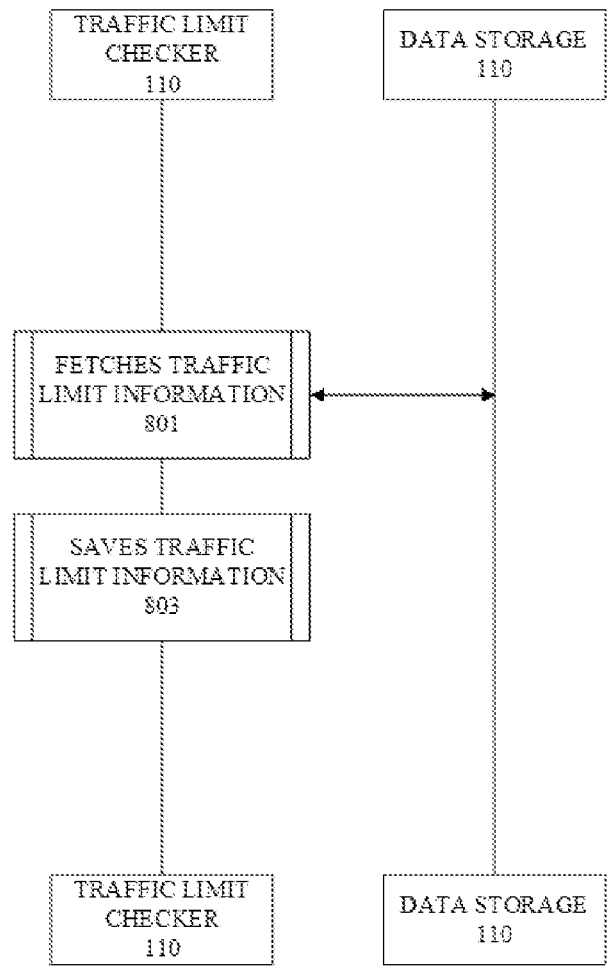
FIG. 8 is an exemplary flow diagram showing traffic limit checker 110 fetching the traffic limit information from data storage 114.
Figure 9:
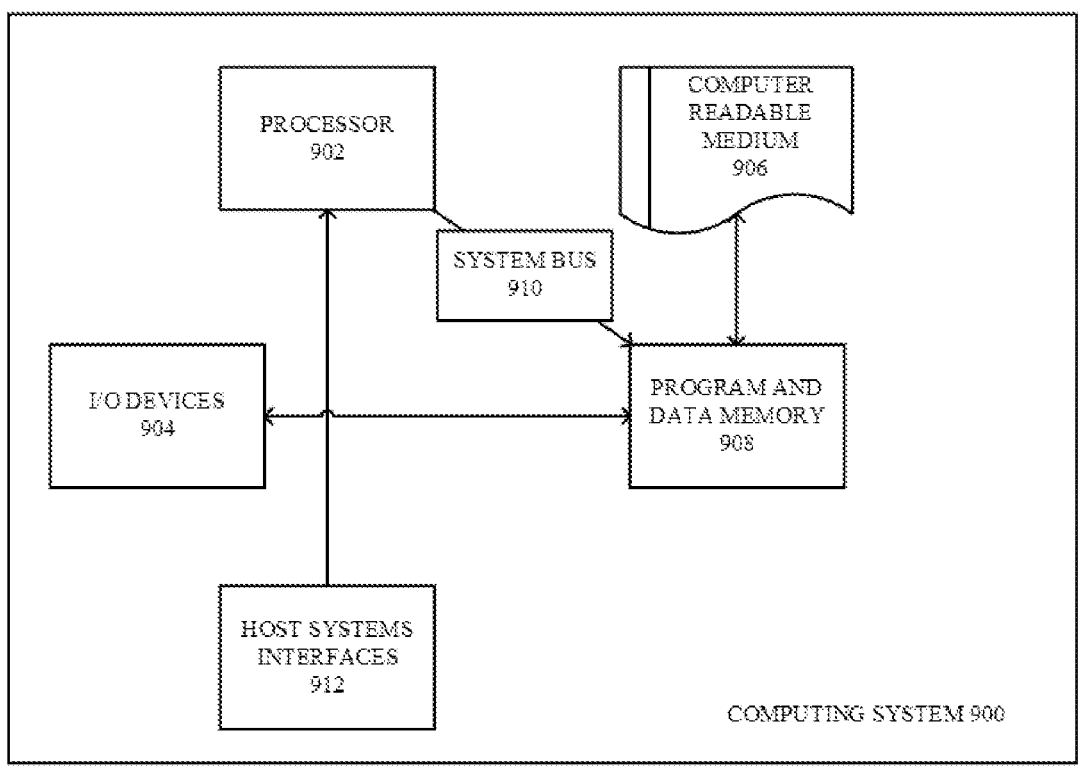
FIG. 9 shows a block diagram of an exemplary computing system.

FIG. 8 is an exemplary flow diagram showing traffic limit checker 110 fetching the traffic limit information from data storage 114. Traffic limit checker 110, in some instances (for example, starting up after a shutdown), can fetch traffic limit information from data storage 114. Accordingly, in step 801, traffic limit checker 110 fetches traffic limit information from data storage 114. Subsequently, in step 803, traffic limit checker 110 places (i.e., saves) the traffic limit information within its memory.

The embodiments herein may be combined or collocated in a variety of alternative ways due to design choice. Accordingly, the features and aspects herein are not in any way intended to be limited to any particular embodiment. Furthermore, one must be aware that the embodiments can take the form of hardware, firmware, software, and/or combinations thereof. In one embodiment, such software includes but is not limited to firmware, resident software, microcode, etc. FIG. 8 illustrates a computing system 900 in which a computer-readable medium 803 may provide instruction for performing any methods and processes disclosed herein.

Furthermore, some aspects of the embodiments herein can take the form of a computer program product accessible from the computer-readable medium 906 to provide program code for use by or in connection with a computer or any instruction execution system. For the purposes of this description, the computer-readable medium 906 can be any apparatus that can tangibly store the program code for use by or in connection with the instruction execution system, apparatus, or device, including the computing system 900.

The computer-readable medium 906 can be any tangible electronic, magnetic, optical, electromagnetic, infrared, or semiconductor system (or apparatus or device). Some examples of a computer-readable medium 906 include solid-state memories, magnetic tapes, removable computer diskettes, random access memories (RAM), read-only memories (ROM), magnetic disks, and optical disks. Some examples of optical disks include read-only compact disks (CD-ROM), read/write compact disks (CD-R/W), and digital versatile disks (DVD).

The computing system 900 can include one or more processors 902 coupled directly or indirectly to memory 908 through a system bus 910. The memory 908 can include local memory employed during actual execution of the program code, bulk storage, and/or cache memories, which provide temporary storage of at least some of the program code in order to reduce the number of times the code is retrieved from bulk storage during execution.

Input/output (I/O) devices 904 (including but not limited to keyboards, displays, pointing devices, I/O interfaces, etc.) can be coupled to the computing system 900 either directly or through intervening I/O controllers. Network adapters may also be coupled to the computing system 800 to enable the computing system 900 to couple to other data processing systems, such as through host systems interfaces 912, printers, and/or storage devices through intervening private or public networks. Modems, cable modems, and Ethernet cards are just examples of network adapter types.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way but may also be configured in ways that are not listed. For the indication of elements, singular or plural form can be used, but it does not limit the scope of the disclosure and the same teaching can apply to multiple objects, even if in the current application an object is referred to in its singular form.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment.

The disclosure presents a method of authorizing a client by utilizing data saved previously within memory of a proxy server, comprising:

transmitting, by a client management service, client authorization data and traffic limit information to a messaging platform, the client authorization data including a client status indicator that indicates whether service for the client by the proxy server is active;

fetching, by the proxy server, the client authorization data from the messaging platform;

fetching, by a traffic limit checker, the traffic limit information from the messaging platform;

establishing, by the client, a connection with the proxy server;

receiving, by the proxy server, a proxy request from the client together with authentication credentials;

verifying, by the proxy server, the authentication credentials by comparing them to the client authorization data;

reading, by the proxy server, the client status indicator received within the client authorization data; and if the client status indicator indicates that the service for the client by the proxy server is active, executing, by the proxy server, the proxy request.

The method is presented further comprising, if the client status indicator indicates that the service for the client by the proxy server is disabled, denying, by the proxy server, the proxy request.

The method is presented wherein the client authorization data and the traffic limit information are placed in separate queues within the messaging platform.

The method is presented wherein the proxy server comprises a memory, the method further comprising storing the client authorization data in the memory.

The method is presented further comprising transferring, by the proxy server and at a fixed time interval, the client authorization data to a persistent storage.

The method is presented wherein the traffic limit checker comprises a memory, the method further comprising storing, by the traffic limit checker, the traffic limit information in the memory.

The method is presented wherein the proxy request sent by the client comprises at least one of the following: a target URL, a request parameter, an authentication credential.

The method is presented wherein the client authorization data further comprises at least one of the following: a client ID and an authentication credential.

The method is presented wherein the traffic limit information comprises at least one of the following: a client ID and a permissible traffic limit.

The method is presented further comprising, by a proxy service provider, generating and assigning a client ID to the client when the client purchases or subscribes to the service.

The method is presented wherein the client ID is a 64-bit integer or 64 characters UID (Unique Identifier).

The method is presented wherein the traffic limit information includes a permissible traffic limit that denotes a maximum amount of web traffic permitted to the client counted in bytes per specific time unit.

The method is presented further comprising measuring and reporting, by the proxy server, usage of traffic to the messaging platform at regular time intervals in the course of executing the proxy request of the client.

The method is presented further comprising:

transmitting, by the client management service to the messaging platform, the traffic limit information indicating a permissible traffic limit to be serviced for the client by the proxy server;

fetching, by a traffic limit checker, the traffic limit information, checking, by the traffic limit checker, whether utilized traffic is equal or greater than the permissible traffic limit; and if the utilized traffic is equal or greater than the permissible traffic limit, sending, by the traffic limit checker, a limit reached message to the messaging platform.

The method is presented further comprising retrieving, by the proxy server from the messaging platform, the limit reached message and wherein the proxy server reads the limit reached message and instantly terminates executing or delegating the proxy request from the client.

The method is presented further comprising, when the utilized traffic is equal or greater than the permissible traffic limit, setting, by the traffic limit checker, a status as 'disabled' to notify that execution of the proxy request must be terminated.

The method is presented wherein the limit reached message comprises at least one of the following or a combination of: a client ID and a status indicator.

The method is presented further comprising increasing the permissible traffic limit when the utilized traffic reaches the permissible traffic limit.

This disclosure presents a non-transitory computer readable device having instructions stored thereon that, when executed by at least one computing device, cause the at least one computing device to perform operations authorizing a client by utilizing data saved previously within memory of a proxy server, the operations comprising:

transmitting, by a client management service, client authorization data and traffic limit information to a messaging platform, the client authorization data including a client status indicator that indicates whether service for the client by the proxy server is active;

fetching, by the proxy server, the client authorization data from the messaging platform;

fetching, by a traffic limit checker, the traffic limit information from the messaging platform;

establishing, by the client, a connection with the proxy server;

receiving, by the proxy server, a proxy request from the client together with authentication credentials;

verifying, by the proxy server, the authentication credentials by comparing them to the client authorization data;

reading, by the proxy server, the client status indicator received within the client authorization data; and if the client status indicator indicates that the service for the client by the proxy server is active, executing, by the proxy server, the proxy request.

The non-transitory computer readable device is presented, the operations further comprising, if the client status indicator indicates that the service for the client by the proxy server is disabled, denying, by the proxy server, the proxy request.

What is claimed is:

1. A method of authorizing a client by utilizing data saved previously within memory of a proxy server, comprising:
    transmitting, by a client management service, client authorization data and traffic limit information to a messaging platform, the client authorization data including a client status indicator that indicates whether service for the client by the proxy server is active, the traffic limit information indicating a permissible traffic limit to be serviced for the client by the proxy server;
    fetching, by the proxy server, the client authorization data from the messaging platform;
    fetching, by a traffic limit checker, the traffic limit information from the messaging platform;
    establishing, by the client, a connection with the proxy server;
    receiving, by the proxy server, a proxy request from the client together with authentication credentials;
    verifying, by the proxy server, the authentication credentials by comparing them to the client authorization data;
    reading, by the proxy server, the client status indicator received within the client authorization data;
    if the client status indicator indicates that the service for the client by the proxy server is active, executing, by the proxy server, the proxy request;
    checking, by the traffic limit checker, whether utilized traffic is equal or greater than the permissible traffic limit;
    if the utilized traffic is equal or greater than the permissible traffic limit, sending, by the traffic limit checker, a limit reached message to the messaging platform; and
    retrieving, by the proxy server from the messaging platform, the limit reached message and wherein the proxy server reads the limit reached message and instantly terminates executing or delegating the proxy request from the client.

2. The method of claim 1, further comprising, if the client status indicator indicates that the service for the client by the proxy server is disabled, denying, by the proxy server, the proxy request.

3. The method of claim 1, wherein the client authorization data and the traffic limit information are placed in separate queues within the messaging platform.

4. The method of claim 1, wherein the proxy server comprises a memory, the method further comprising storing the client authorization data in the memory.

5. The method of claim 1, further comprising transferring, by the proxy server and at a fixed time interval, the client authorization data to a persistent storage.

6. The method of claim 1, wherein the traffic limit checker comprises a memory, the method further comprising storing, by the traffic limit checker, the traffic limit information in the memory.

7. The method of claim 1, wherein the proxy request sent by the client comprises at least one of the following: a target URL, a request parameter, an authentication credential.

8. The method of claim 1, wherein the client authorization data further comprises at least one of the following: a client ID and an authentication credential.

9. The method of claim 1, wherein the traffic limit information comprises at least one of the following: a client ID and a permissible traffic limit.

10. The method of claim 9, further comprising, by a proxy service provider, generating and assigning a client ID to the client when the client purchases or subscribes to the service.

11. The method of claim 10, wherein the client ID is a 64-bit integer or 64 characters UID (Unique Identifier).

12. The method of claim 1, wherein the traffic limit information includes a permissible traffic limit that denotes a maximum amount of web traffic permitted to the client counted in bytes per specific time unit.

13. The method of claim 12, further comprising measuring and reporting, by the proxy server, usage of traffic to the messaging platform at regular time intervals in the course of executing the proxy request of the client.

14. The method of claim 1, further comprising, when the utilized traffic is equal or greater than the permissible traffic limit, setting, by the traffic limit checker, a status as 'disabled' to notify that executing of the proxy request must be terminated.

15. The method of claim 1, wherein the limit reached message comprises at least one of the following or a combination of: a client ID and a status indicator.

16. The method of claim 1, further comprising increasing the permissible traffic limit when the utilized traffic reaches the permissible traffic limit.

17. A non-transitory computer readable device having instructions stored thereon that, when executed by at least one computing device, cause the at least one computing device to perform operations authorizing a client by utilizing data saved previously within memory of a proxy server, the operations comprising:
    transmitting, by a client management service, client authorization data and traffic limit information to a messaging platform, the client authorization data including a client status indicator that indicates whether service for the client by the proxy server is active, the traffic limit information indicating a permissible traffic limit to be serviced for the client by the proxy server;
    fetching, by the proxy server, the client authorization data from the messaging platform;
    fetching, by a traffic limit checker, the traffic limit information from the messaging platform;

establishing, by the client, a connection with the proxy server;

receiving, by the proxy server, a proxy request from the client together with authentication credentials;

verifying, by the proxy server, the authentication credentials by comparing them to the client authorization data;

reading, by the proxy server, the client status indicator received within the client authorization data; and if the client status indicator indicates that the service for the client by the proxy server is active, executing, by the proxy server, the proxy request;

checking, by the traffic limit checker, whether utilized traffic is equal or greater than the permissible traffic limit;

if the utilized traffic is equal or greater than the permissible traffic limit, sending, by the traffic limit checker, a limit reached message to the messaging platform; and retrieving, by the proxy server from the messaging platform, the limit reached message and wherein the proxy server reads the limit reached message and instantly terminates executing or delegating the proxy request from the client.

18. The non-transitory computer readable device of claim 17, the operations further comprising, if the client status indicator indicates that the service for the client by the proxy server is disabled, denying, by the proxy server, the proxy request.

\* \* \* \* \*